Jan. 19, 1932.  E. A. PARHAM  1,841,497
AUTOMATIC VARIABLE PITCH PROPELLER
Filed April 14, 1931  3 Sheets-Sheet 1
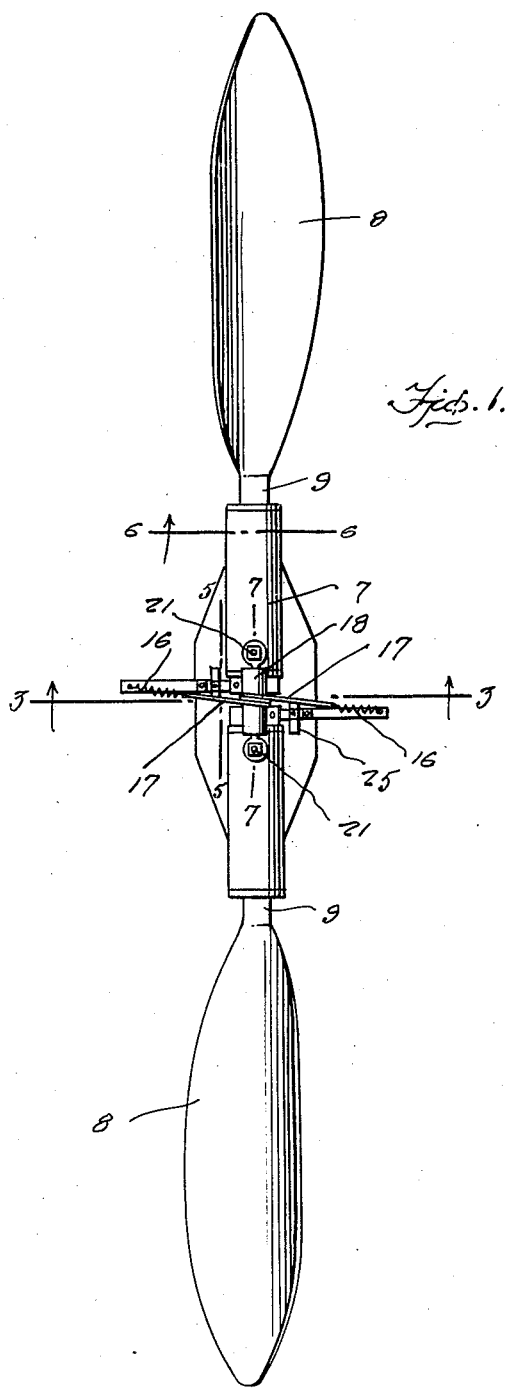
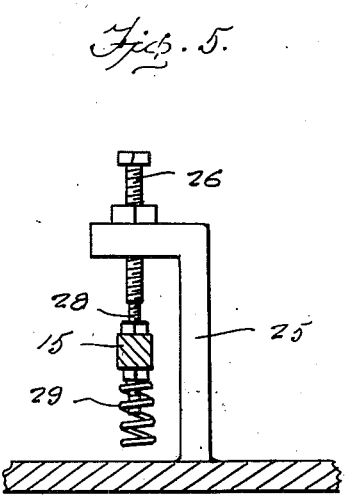
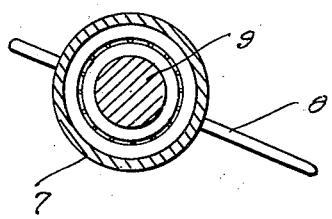
Inventor
E. A. Parham
By Clarence A. O'Brien
Attorney

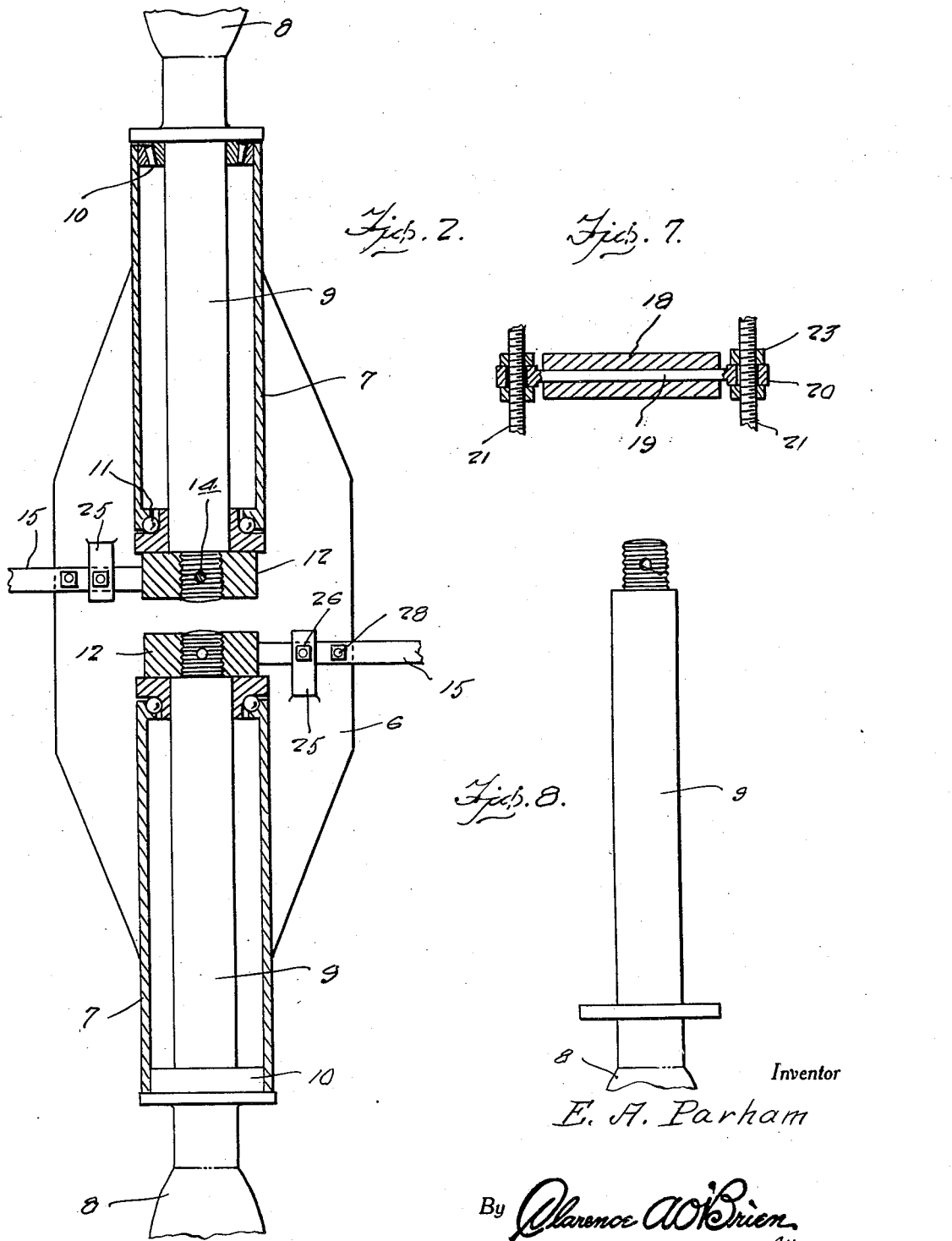

Jan. 19, 1932.  E. A. PARHAM  1,841,497
AUTOMATIC VARIABLE PITCH PROPELLER
Filed April 14, 1931  3 Sheets-Sheet 3
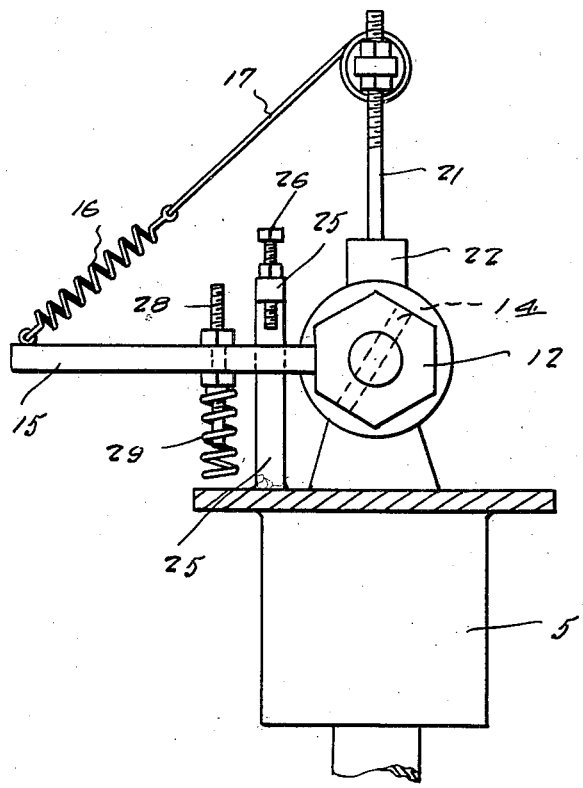
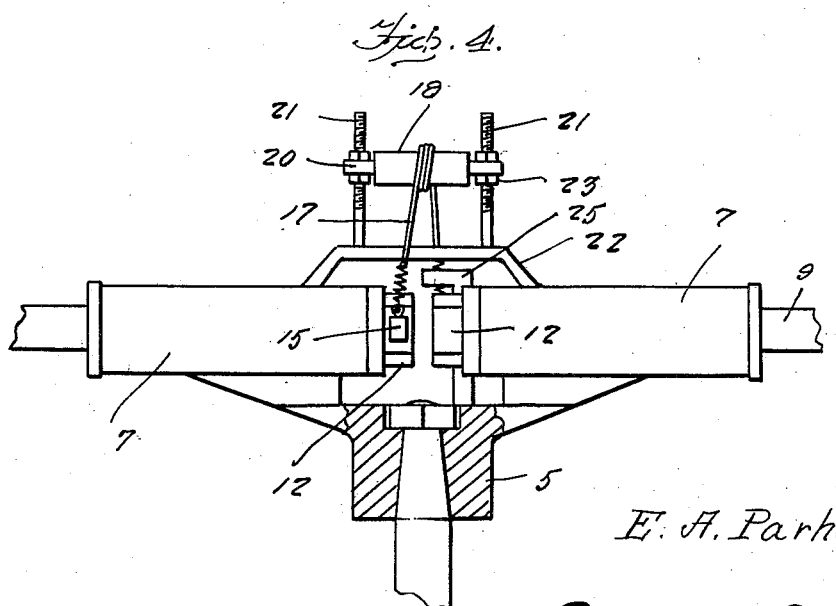
Inventor
E. A. Parham
By Clarence A. O'Brien
Attorney Patented Jan. 19, 1932

1,841,497

UNITED STATES PATENT OFFICE

EDWIN A. PARHAM, OF JACKSON, MICHIGAN

AUTOMATIC VARIABLE PITCH PROPELLER

Application filed April 14, 1931. Serial No. 530,031.

The present invention relates to a propeller for aircraft and the like and has for its prime object to provide means providing an automatic variable pitch for the blades.

Another important object of the invention resides in the provision of an automatic variable pitch propeller of this nature which is simple in its construction, inexpensive to manufacture, strong and durable, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is an end elevation of a propeller structure embodying the features of my invention.

Figure 2 is a longitudinal section therethrough.

Figure 3 is a section taken substantially on the line 3—3 of Figure 1.

Figure 4 is a side elevation of the propeller structure showing the hub in section.

Figure 5 is a detail section taken substantially on the line 5—5 of Figure 1.

Figure 6 is a section taken substantially on the line 6—6 of Figure 1.

Figure 7 is a detail section taken substantially on the line 7—7 of Figure 1, and Figure 8 is a detail elevation of one of the blade shanks.

Referring to the drawings, in detail it will be seen that numeral 5 denotes a hub with a plate 6 thereon. On this plate 6 is disposed a pair of axially alined cylindrical casings 7 the axis of which is at right angles to the axis of the hub.

Numerals 8 denote blades having shanks 9 journalled longitudinally through the casings 7 in roller bearings 10 and combination load and thrust bearings 11. Nuts 12 are threaded on the inner ends of the shanks 9 and pinned thereto as at 14. These nuts have arms 15 extending therefrom in opposite directions radially to the axis of the shanks.

Springs 16 are anchored on the ends of the arms 15 and have secured thereto a cable 17 the intermediate portion of which is wound about a roller 18 rotatable about shaft 19 having its ends terminating in eyes 20 circumjacent rods 21 projecting outwardly from a bracket 22 fixed to the casings 7 on the opposite side from the hub, the outer ends of the rods being threaded to receive nuts 23 one to each side of each eye 20 so that the roller 18 may be adjusted to place the desired tension of the springs 16. The power of these springs is equal to the air pressure on the face side of the trailing edges of the blade.

The blades will then adjust their own pitch according to the power input. Stop brackets 25 are mounted on the plate 6 one for each arm 15 and are provided with right angular extensions 25 with stop screws 26 adjustable therein with which the arms 15 will abut at the limit of their swinging movement in one direction. Numerals 28 denote adjustable low limit stops with spring cushions 29 mounted thereon. These stops 28 are adjustably anchored in intermediate portions of the arms 15.

On account of the large area of blades on the trailing edge sides of the center line of the blade bearings, the blades act as a vane pulling on the springs 16. When the air pressure and springs are balanced with the power input there is provided an automatic variable pitch propeller as will be seen from the air pressure on one of the blades 8 causing a change of pitch of the blade which would act to move the arm 15 in a direction to exert a pull on one end of the cable, the rotary movement of the roller 18 results from this pull but exerts a pull on the other end of the cable so that the arm 15 of the other blade would be moved in the same direction and thus the blade can be moved to the same extent as the first blade and thus the pitch of both blades would be changed equally. Thus both blades will be adjusted simultaneously to less pitch or greater pitch, as the cable 17 winds on or off the drum.

It is thought that the construction, operation, utility and advantages of this invention will now be apparent to those skilled in this are without a more detailed description thereof.

The present embodiment of the invention has been described in considerable detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a propeller structure of the class described, a hub structure, a pair of blades axially alined, means for rotatably mounting the blades on the hub structure, arms connected to said blades and extending in opposite directions from each other, springs engaged with the outer portions of the arm, a cable connected to said springs, a roller about which the intermediate portion of said cable is wound, and means for mounting the roller.

2. In a propeller structure of the class described, a hub structure, a pair of blades axially alined, means for rotatably mounting the blades on the hub structure, arms connected to said blades and extending in opposite directions from each other, springs engaged with the outer portions of the arm, a cable connected to said springs, a roller about which the intermediate portion of said cable is wound, and means for mounting the roller, said means being adjustable to place the desired tension on the spring.

3. In a propeller structure of the class described, a hub structure, a pair of blades axially alined, means for rotatably mounting the blades on the hub structure, arms connected to said blades and extending in opposite directions from each other, springs engaged with the outer portions of the arm, a cable connected to said springs, a roller about which the intermediate portion of said cable is wound, and means for mounting the roller, said means being adjustable to place the desired tension on the spring, adjustable stop means for limiting the swinging movement of the arms.

In testimony whereof I affix my signature.

EDWIN A. PARHAM.